United States Patent [19]

Pogorzelski et al.

[11] Patent Number: 5,014,236

[45] Date of Patent: May 7, 1991

[54] INPUT/OUTPUT BUS EXPANSION INTERFACE

[75] Inventors: James S. Pogorzelski, Georgetown; Craig H. Shempert, Austin, both of Tex.

[73] Assignee: International Business Machines Corporation, Armonk, N.Y.

[21] Appl. No.: 149,796

[22] Filed: Jan. 29, 1988

[51] Int. Cl.⁵ .................. G06F 3/00; G06F 13/12; G06F 13/32
[52] U.S. Cl. .................. 364/900; 364/927.93; 364/927.99; 364/941
[58] Field of Search .................. 364/200, 900

[56] References Cited

U.S. PATENT DOCUMENTS

| | | | |
|---|---|---|---|
| 3,725,864 | 4/1973 | Clark et al. | 364/200 |
| 4,417,303 | 11/1983 | Korowitz et al. | 364/200 |
| 4,447,878 | 5/1984 | Kinnie et al. | 364/200 |
| 4,716,527 | 12/1987 | Graciotti | 364/200 |
| 4,727,477 | 2/1988 | Gavril | 364/200 |

OTHER PUBLICATIONS

IBM Technical Disclosure Bulletin, vol. 14, No. 3, Aug. 1971, pp. 799-800, R. A. Palm et al, "I/O Channel for Computer".

IBM Technical Disclosure Bulletin, vol. 26, No. 10A, Mar. 1984, pp. 5199-5206, S. E. Edick, "Direct Memory Access Controller".

IBM Technical Disclosure Bulletin, vol. 30, No. 6, Nov. 1987, pp. 205-207, "Eight-Bit to Sixteen-Bit Memory Converter".

Primary Examiner—Gareth D. Shaw
Assistant Examiner—John C. Loomis
Attorney, Agent, or Firm—Douglas H. Lefeve

[57] ABSTRACT

An I/O bus expansion interface is disclosed which enables an I/O device having an n-bit data bus to be interfaced to an m times n-bit I/O data bus of a host processor. This I/O bus expansion circuit maximizes the computer processor's performance by providing full I/O data bus bandwidth and allowing overlap of processor execution and I/O bus expansion interface circuit operation. This is accomplished by: (1) prefetching multiple control and/or data fields from the I/O device and presenting that information to the host without delay and (2) burst writing multiple fields from the host to the bus expansion interface circuit, without delay of the host, and thereafter making these fields individually available to the I/O device.

10 Claims, 7 Drawing Sheets

INPUT/OUTPUT BUS EXPANSION INTERFACE

DESCRIPTION

1. Technical Field

This invention relates to data processing system interfaces in general, and more particularly to an arrangement for interfacing a device having an n-bit Input/Output (I/O) data bus to an m times n-bit I/O data bus.

2. Background Art

Today's processor development is far exceeding the development of I/O device support. It is common place now for personal, mini and micro computers to have thirtytwo bit processor units that can execute instructions in the tens of nanoseconds and have I/O data bus widths of thirty-two bits, while only recently such processors had executed instructions in tens of microseconds and had I/O-data bus widths of eight bits. The I/O device technology, however, is developing at a much slower pace. Because optimal utilization of these new high performance processors is highly I/O intensive (i.e., they spend much of their time accessing disks, communication ports, etc.) users have often not been able to realize the full potential of their processing power due to the low bandwidth of their I/O buses.

Many of the available I/O devices for use with state of the art computers do not fully exploit the bandwidth of the I/O buses supported by their processors. As the processor technology has rapidly progressed from eight bit I/O buses to sixteen bits and now thirty-two bit data buses, the peripheral device development support has been much slower such that many of these devices still provide only eight bit data buses.

One of the reasons for the slower device development has been the cost of the I/O devices themselves. Another reason has been the packaging of these devices, due to the larger data bus pin out required.

By way of example, no present Universal Asynchronous Receiver/Transmitter (UART) exists which has a thirty-two bit I/O bus, although there is a real need for such a device to fully utilize the potential of the newest processors which have thirty-two bit I/O buses. The traditional solution to this problem has been to effectively operate the processor as if it, too, was limited to an eight bit bus while it communicated with the eight bit UART. The performance compromises involved with this solution are well understood.

It would, therefore, be of great benefit to have the capability to interface the newer processors having wider buses to the existing I/O devices having narrower buses while operating the processor as if it were communicating with an I/O device having a bus width equal to its own.

SUMMARY OF THE INVENTION

An I/O bus expansion interface technique is disclosed which enables an I/O device having an n-bit data bus to be interfaced to an m times n-bit I/O data bus of a host processor. This I/O bus expansion circuit is an interface which maximizes the computer processor's performance by providing full I/O data bus bandwidth and allowing overlap of processor execution and I/O bus expansion interface circuit operation. This is accomplished by: (1) prefetching multiple control and/or data fields from the I/O device and presenting that information to the host without delay and 2) burst writing multiple fields from the host to the bus expansion interface circuit, without delay of the host, and thereafter making these fields individually available to the I/O device.

The bus expansion circuit is composed of a set of registers and control logic with which a host computer communicates through the m times n-bit I/O bus associated with the host computer. This bus expansion circuit then communicates with the n-bit bus of the external I/O device, such as a UART. The processor writes out as much as m times n bits to a write register in one operation. Then, in a succession of operations of the bus expansion circuit, n-bit portions of this data are communicated to the external I/O device. As a complement of this operation, the control logic of the bus expansion circuit is able to load an m times n bit wide read register through a succession of n-bit reads of the I/O device so that the host computer processor can then execute a single read operation to read the m times n bits. The control logic is further operable to allow direct host computer to I/O device communication for transfer of I/O device control information of less than m times n bits.

Accordingly, this invention provides a simple means to multiplex data and control information from a device having an n-bit (e.g., eight bit) I/O bus onto a processor's I/O data bus which can be any multiple of n bits wide, for example, thirty-two bits. This I/O bus expansion circuit provides an inexpensive yet effective means to gain back the I/O bus bandwidth for processors with data buses that are larger than n bits. The circuit may be used on the processor boards, on nonintelligent adapters and on intelligent adapters which also contain processors with I/O data buses greater than n bits. For example, the circuit can be used with eight bit UARTs, eight bit diskette controllers, eight bit hard file controllers, and eight bit time-of-day clocks which provide multiple bytes of data, as well as floating point math processors.

The foregoing and other objects, features, extensions, and advantages of the invention will be apparent from the following more particular description of preferred embodiments of the invention as illustrated in the accompanying drawings.

BEST MODE FOR CARRYING OUT THE INVENTION

Figure 1:
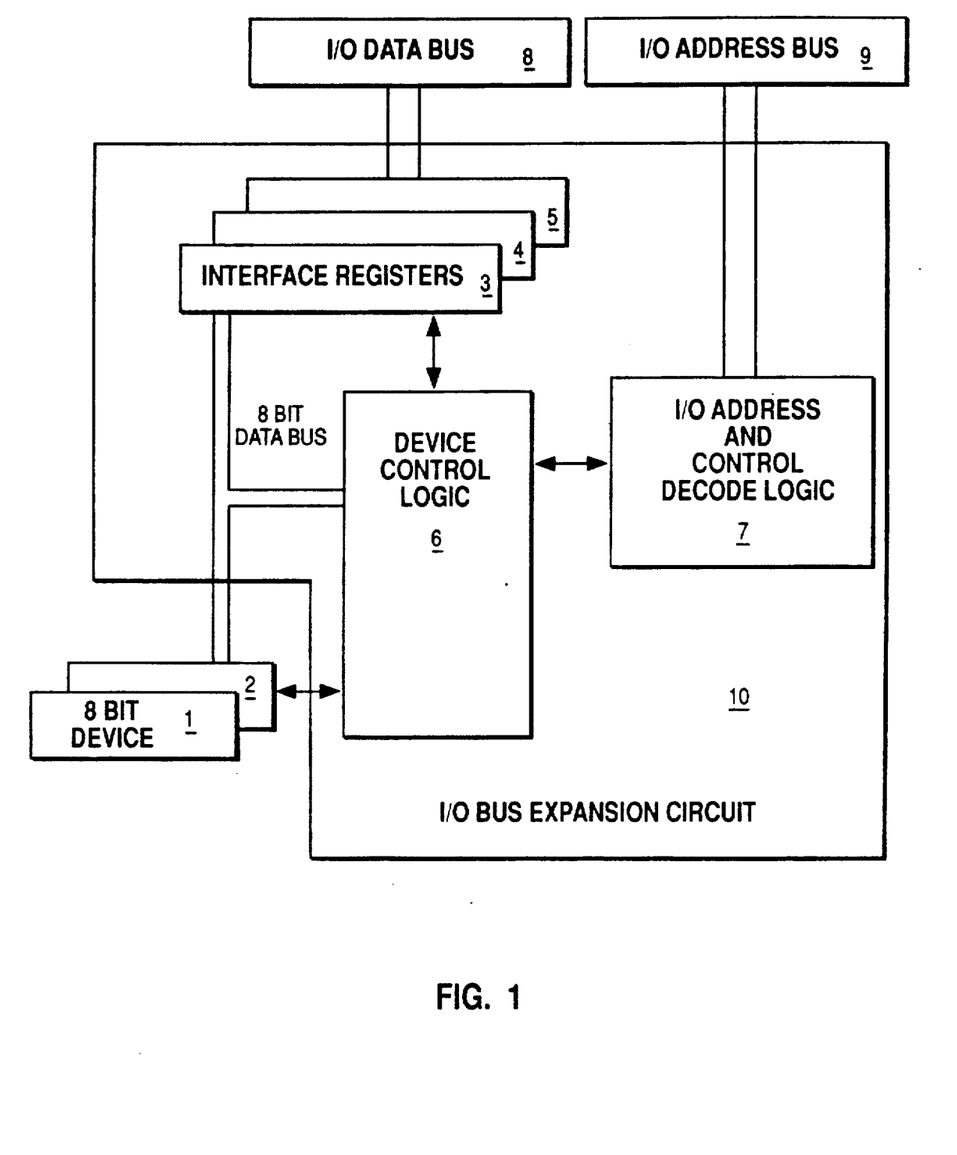
FIG. 1 is a block diagram of the I/O bus expansion circuit of this invention.

Referring now to FIG. 1, one or more I/O devices 1 and 2 having n-bit data buses communicate via an n-bit data bus to a set of Interface Register, 3, 4, and 5 within the I/O Bus Expansion Circuit 10 of this invention. As will be described in detail below, the registers 3-5 communicate with a host computer's I/O Data Bus 8 which may be m times n bits wide. Also contained within the I/O Bus Expansion Circuit 10 is an I/O Address and Control Decode Logic Unit 7 which communicates with the host computer's I/O Address Bus 9, as described below. The I/O devices 1 and 2, the Interface registers 3, 4, and 5, and the I/O Address and Control Decode Logic Unit 7 are also communicated directly with, by a Device Control Logic Unit 6.

The width of the Interface Registers 3, 4, and 5 is equal to the width of the I/O Data Bus 8. Each register is composed of n-bit segments which are separately gatable within the Bus Expansion Circuit 10. These registers may be gated to or from the I/O Data Bus 8 at the full width of the Data Bus 8. Each of these registers is uniquely addressable by the I/O bus.

A Device Interrupt Interface Register 3 is loaded by the Device Control Logic Unit 6 when a device requires service. The format of this register is both device and data bus width dependent. The purpose of this register is to allow the Bus Expansion Circuit 10 to gate additional data to the I/O data bus than simply the device n-bit service request. In the case in which an n-bit UART is one of devices 1-2, this register contains an identifier of the UART requesting service and the actual service request as read by the Device Control Logic Unit 6 from the UART.

A Device Read Data Interface Register 4 is loaded by the Device Control Logic Unit 6 when a device service request indicates that there is data available for the processor. The Device Control Logic Unit 6 will automatically read the data from the device and gate the data into the proper n-bit segment of this register before interrupting the processor with the service request.

It is possible that this Device Read Data Register 4 can be duplicated multiple times for a particular implementation. For example, if the device is capable of buffering or fetching more than one times the I/O data bus width then it may be advantageous to have more than one Device Read Data Register all of which are separately addressable from the I/O bus.

This feature of the I/O Bus Expansion Circuit 10 is to have the data available at the time of the processor interrupt and not cause the processor or I/O bus to wait for the data. It also provides for full utilization of the I/O bus bandwidth on read operations. An additional feature that is provided in this generalized example is that the Device Control Logic Unit 6 can prefetch more data from the I/O device 1 or 2 while the host processor processes the data that was previously read.

There are multiple addresses to the Device Write Data Interface Register 5. The number of these addresses is dependent on the number of devices being supported and the width of the two data buses. In the example of an n-bit device 1 or 2 communicating with an m times n bit wide host computer I/O bus there are four separate addresses for each device 1 or 2 to the Device Data Write Register 5. One of the addresses to these registers indicates a four byte write, a second of the addresses indicates a three byte write, another of the addresses indicates a two byte write and a fourth of these addresses indicates a one byte write.

The Device Control Logic Unit 6 gates the I/O bus to the appropriate Device Write Data Register 5 address when it decodes an I/O bus write operation. It can then gate the proper number of data bytes to the n-bit device. This feature allows the host processor to fully utilize the I/O bus bandwidth for write operations and allows the Device Control Logic Unit 6 to gate the data in one byte operations to the device while the processor is left free to do additional work.

The Device Control Logic Unit 6 provides the necessary function to respond to interrupts from the devices 1 or 2 and to read and write requests from the I/O buses 8 and 9.

When the device 1 or 2 requests service via an interrupt the Device Control Logic Unit 6 reads the service request from the device and gates it and additional data as required to the Device Interrupt Register 3. It then may optionally interrupt the processor depending on the type of service request made by the device.

When the Device Control Logic Unit 6 is notified by the Address and Control Decode Logic Unit 7 that the Write Data Register 5 has been written it then moves this data from the register to the device.

When the device 1 or 2 makes a request indicating that it has data for the host this logic can read the data from the device and gate it to the proper n-bit segment of the Read Data Register 4. This feature allows the I/O Bus Expansion Circuit to work asynchronously with the processor. The Device Control Logic Unit 6 also provides the synchronization between the two I/O data buses to insure that no data is lost.

The Address and Control Decode Logic Unit 7 provides the necessary controls to gate data to the Write Data Register 5 during I/O write operations. It also provides the logic to gate the Read Data Register 4 and Device Interrupt Register 3 to the I/O data bus for host processor read operations.

Figure 2:
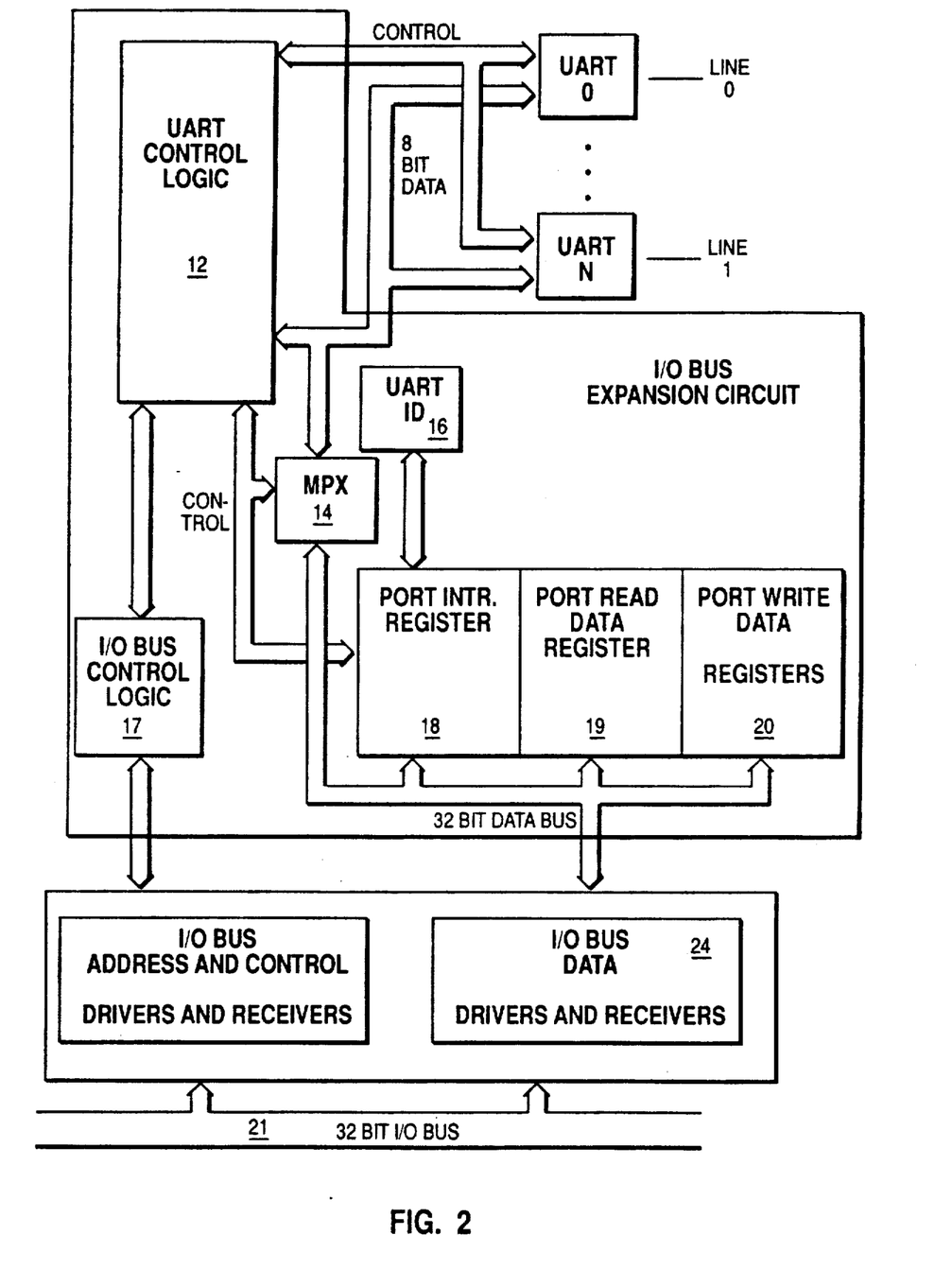
FIG. 2 is an implementation of the bus expansion circuit in which an eight bit UART is interfaced to a 32 bit computer I/O data bus.

FIG. 2 shows an implementation of the I/O Bus Expansion Circuit for interfacing a National Semiconductor eight bit UART, part number NS16550A to a 32 bit I/O data bus. Those skilled in art will recognize that while a particular eight bit UART has been chosen for this example, the invention taught and claimed herein may be utilized to interface any of a multitude of other devices having n-bit I/O buses to other buses which are m times n bits wide. In this implementation the device control logic consists of the UART Control Logic 12, the 32 bit to 8 bit Multiplexor (MPX) 14 and the UART ID Register 16.

This implementation converts the UART's Interrupt Identification Register, Line Status Register and Receiver Buffer and Transmit Holding Register from the UART's eight bit bus to the host processor's thirty-two bit bus. It could also have converted the Interrupt Enable Register, FIFO Register, Modem Control, Line Control Register and Divisor Latch Registers to Port Write Data Registers and the Modem Status Register and Divisor Latch Registers to Port Read Data Registers. For simplification, these conversions need not be included because they are used only during the initialization of the device.

The functions of the UART Control Logic 12 are to: (1) select the UART 0-N to be serviced, (2) gate the data to and from the 8 bit bus to the proper segment of the Port Read Data Register 19 and Port Write Data Register 20 by directing the multiplexor 14, (3) sense the UART interrupt lines and interpret the contents of the Interrupt Identification Register, and create an interrupt to the host processor when the proper conditions have been met.

The UART ID Register 16 provides the mechanism to latch up the ID of the current UART that is being serviced. It also provides the priority selection of UART's in the case that multiple UART's request service at the same time.

The Port Interrupt Register 18 is a single thirty-two bit wide register that is loaded by the UART Control Logic 12 with: (1) the contents of the UART ID Register 16 (two bytes) and (2) the contents of the Interrupt Identification Register from the UART which requires service.

The Port Read Data Register 19 is a single thirty-two bit wide register to which the contents of the Receiver Buffer and Line Status Registers for the UART requiring receive data service are gated.

There is only one physical Port Write Data Register 20 per UART; however it can be addressed four times for each UART that is installed. The four addresses per UART are used to inform the UART Control Logic 12 of the number of valid bytes of data that were placed on the I/O bus. For example, address x indicates that four bytes of data were placed on the I/O bus, address x+1 indicates that three bytes of data were placed on the I/O bus, address x+2 indicates that two bytes of data were placed on the I/O bus, and address x+3 indicates that one byte of data was placed on the I/O bus.

The I/O Address and Control Decode Logic 17 decodes the I/O read and write control lines and gates data to or from the selected register and decodes the I/O addresses to select the proper register.

Figure 3:
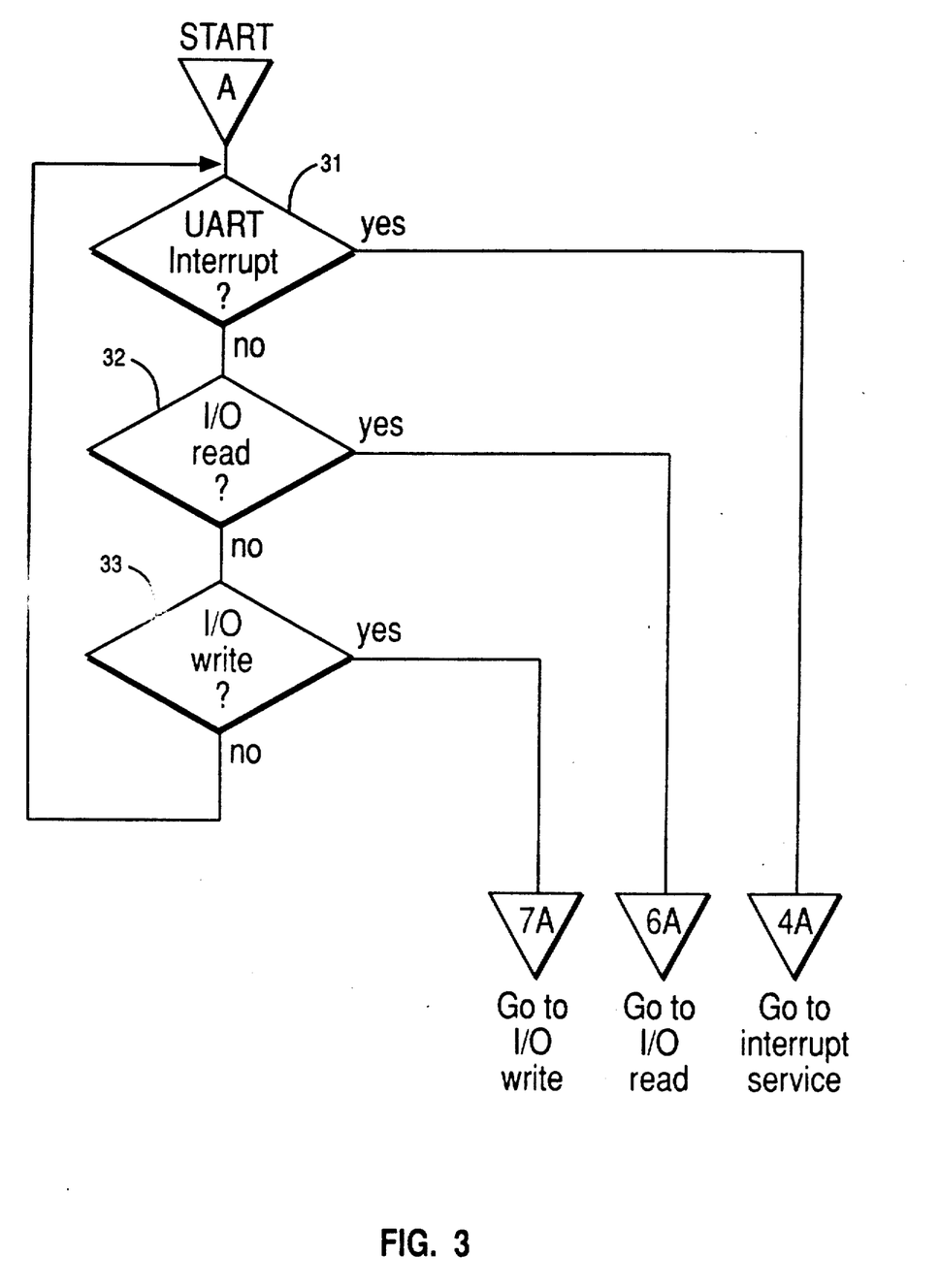
FIGS. 3-7 are flow diagrams of the operation of the devices in FIG. 2 as this invention is utilized for efficiently interfacing a UART having an eight bit I/O data bus to a thirty-two bit computer I/O data bus.

Reference is now made to the flow diagrams of FIGS. 3-7 which show the operation of the devices in FIG. 2 as this invention is utilized for efficiently interfacing an eight bit I/O UART to a thirty-two bit computer I/O bus. The decision blocks 31-33 of FIG. 3 represent the three conditions under which the UART Control Logic 12 of FIG. 2 responds to the UARTs O-N or the Host Computer I/O Bus 21 in FIG. 2. In FIG. 3 at 31, assume that one of the UARTs O-N has issued an interrupt. The operation then proceeds to the interrupt service routine depicted in FIG. 4.

Figure 4:
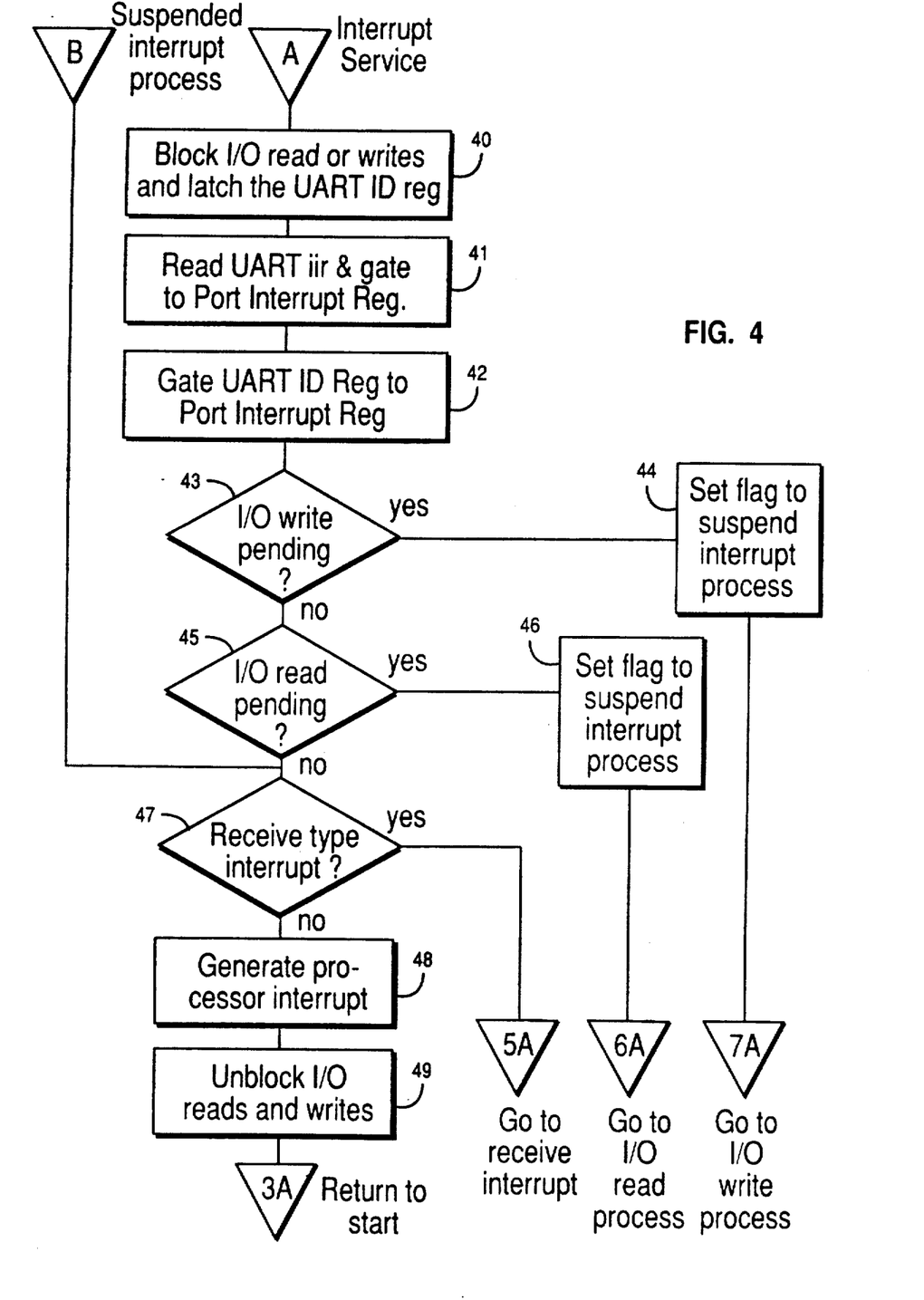
Figure 5:
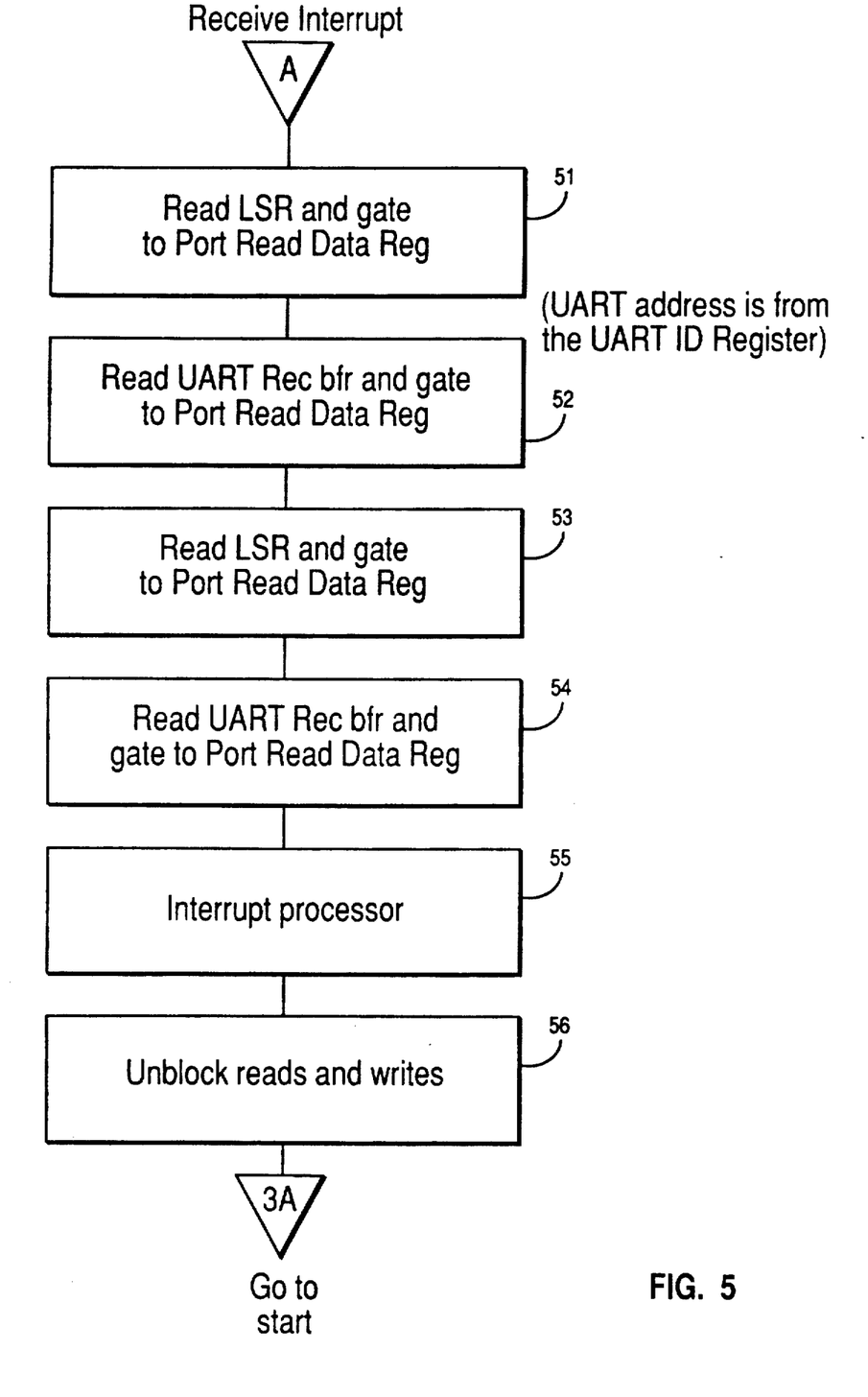

In FIG. 4 at 40 the I/O Bus Control Logic 17 is enabled to block I/O accesses from or to the thirty-two bit I/O Bus 21 of the host computer from interfering with the current process. Concurrently, the identifier presently resident in the UART Identification Register 16 is latched to enable the logic to know which of the UARTs 0-N is issuing the interrupt. At 41, the UART Control Logic 12 reads the interrupt identification register of the particular UART whose identifier is currently latched in the UART ID Register 16. The contents of the UART interrupt instruction register tell the logic what type of UART interrupt is pending, such as "transmit holding register empty", "modem status", or a "receive" type interrupt, as described in detail below. These contents are then gated to the proper segment of the Port Interrupt Register 18. At 42 the contents of the UART ID Register 16 are gated to the proper segment of the Port Interrupt Register 18.

At 43 a test is made by the UART Control Logic 12 to determine if an I/O write from the host computer bus is pending. If so, a flag is set at 44 to suspend this UART interrupt process to prevent undue delay in the host computer's I/O write from its data bus. Assuming at 43 that an I/O write is not pending, at 45 a test is made to determine if an I/O read is pending. If so, at 46 a flag is set to suspend the interrupt process to allow the host computer to proceed immediately with reading data from the UART and bus expansion circuit so as not to delay the host computer. Assuming that an I/O read was not pending at 45, at 47 a test is made to determine if the UART interrupt is a receive type interrupt. Assuming that the UART interrupt is not a receive type interrupt, at 48 the UART Control Logic 12 generates a processor interrupt which is conveyed back to the thirty-two bit Host Computer I/O Bus 21. Thereafter, at 49 I/O reads and writes can be unblocked by the I/O Bus Control Logic 17.

Assume now that at 47 the UART interrupt was a receive type interrupt. "Receive line status", "receive data available", and "character timeout" are examples of receive type interrupts. The operation then proceeds as described in the flow chart of FIG. 5. At block 51 the contents of the line status register of the UART are read and gated to the proper segment of the Port Read Data Register 19. The contents of the line status register comprise eight bits. The UART address for this operation is known from the contents of the UART ID Register 16. At 52, the contents of the UART receive buffer are read and gated to the proper segment of the Port Read Data Register 19. This operation loads an eight bit data byte into the Port Read Data Register 19. At 53 the line status register of the UART is again read and its contents are gated to the proper segment of the Port Read Data Register 19. At 54 the UART receive buffer is again read and its contents are gated to the proper segment of the Port Read Data Register 19. The Port Read Data Register 19 now contains thirty-two bits. At block 55 an interrupt is issued to the host computer's thirty-two bit I/O Bus 21 and at 56 I/O reads and writes are unblocked by the I/O Bus Control Logic 17. Thereafter, the operation proceeds back to the three decisions of FIG. 3.

In FIG. 3, assume now that at block 32 and I/O read is detected which indicates that the host processor is ready to read data from the bus expansion circuit. The operation then proceeds to the flow chart of FIG. 6.

Figure 6:
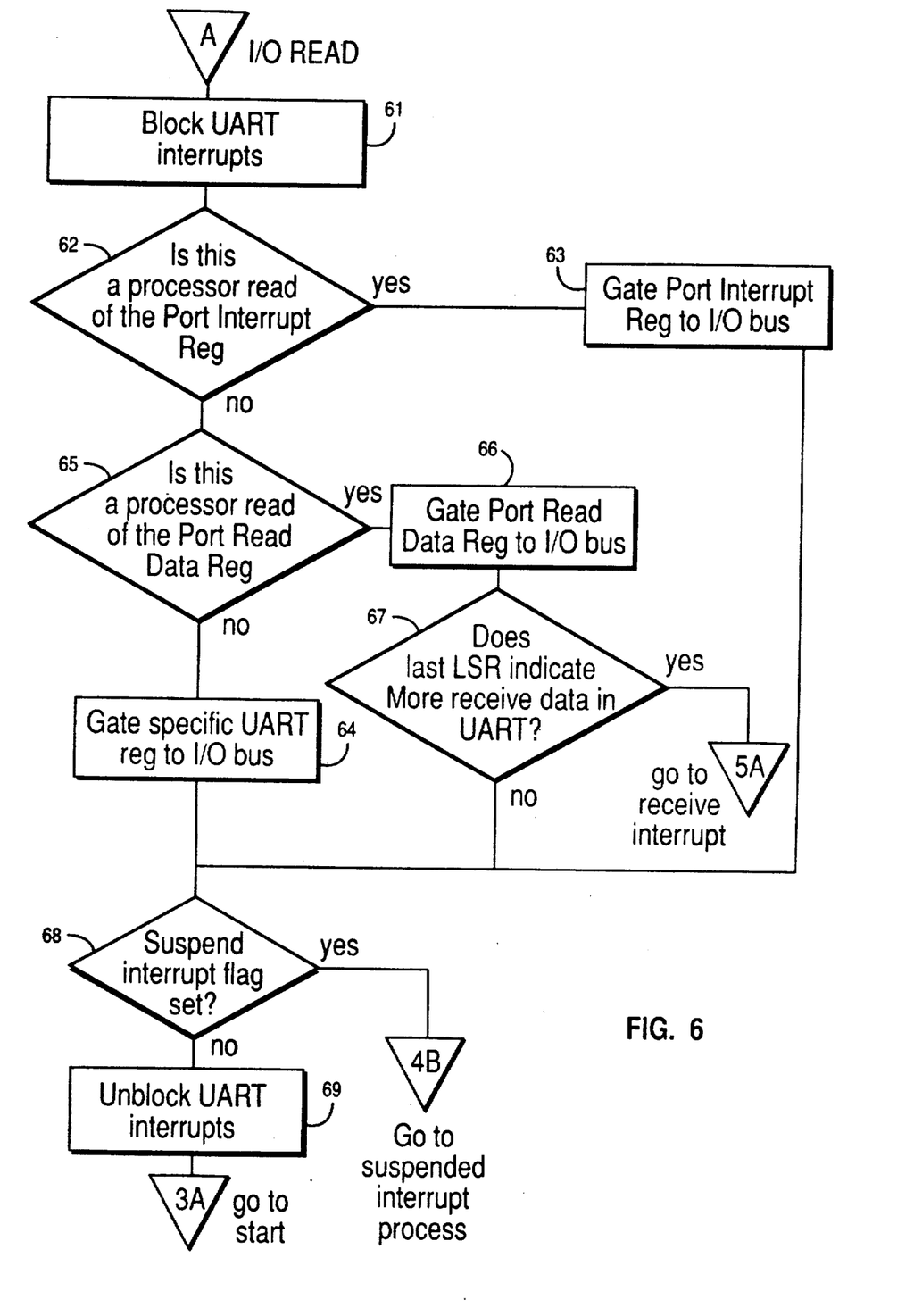

In FIG. 6, when an I/O read is detected, at 61 the UART Control Logic 12 blocks any UART interrupts from further affecting the I/O bus expansion circuit. At 62 a test is made to determine if this I/O read from the host computer is a system read of the Port Interrupt Register 18. If so, the contents of the Port Interrupt Register 18 are gated to the host computer's thirty-two bit I/O Bus 21 through the I/O Bus Data Drivers and Receivers 24. If the I/O read is not a request for a system read of the Port Interrupt Register 18, at 64 the specific UART register is gated from the UART to the I/O Bus 21. At 68, if this I/O read occurs during the suspension of the servicing of a UART interrupt (block 46, FIG. 4), the operation proceeds back to block 47, FIG. 4 to resume the servicing of the UART interrupt. Otherwise, the operation proceeds to 69 to re-enable the UART Control Logic 12 to receive UART interrupts which were previously blocked at 61, at the beginning of the I/O read service.

In the I/O read operation of FIG. 6, an alternative to a system read of the Port Interrupt Register 18 (block 63) or a read of a specific UART register (block 64) is a system read of the Port Read Data Register 19. If this service is requested at block 65, the operation proceeds to 66 at which point the contents of the Port Read Data Register 19 are gated through the I/O Bus Data Drivers and Receivers 24 to the Host Computer thirty-two bit I/O Bus 21. If, however, the last UART line status register indicates that there is more received data in the UART, at 67 after gating the contents of the Port Read Data Register 19 to the host computer, the operation jumps to the handling of the receive interrupt which was described above in FIG. 5.

Figure 7:
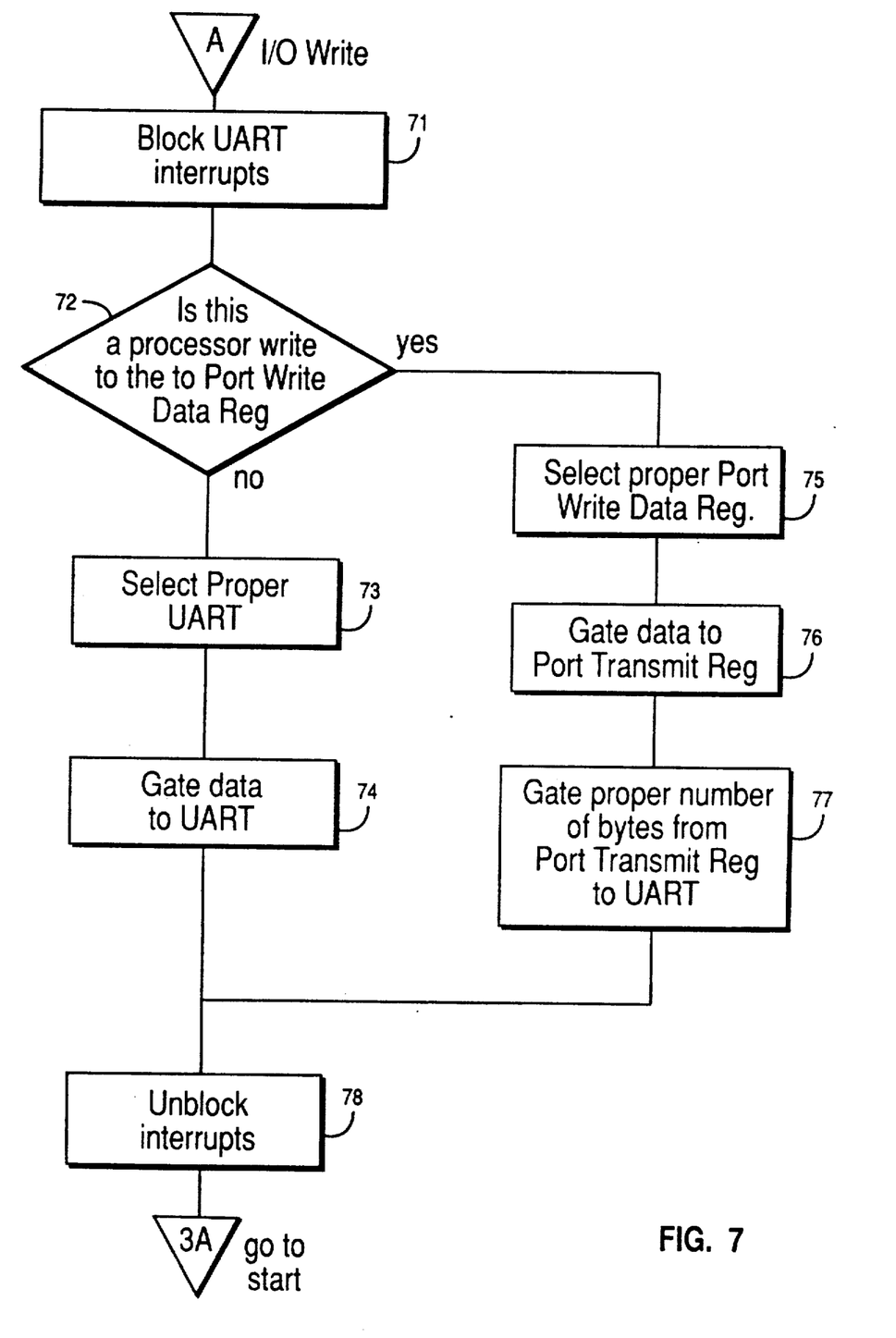

Referring back to FIG. 3, if an I/O write is detected at 33, indicating that the host computer is ready to write data out to a UART, the operation proceeds to 71, FIG. 7, wherein further UART interrupts are blocked by the UART Control Logic 12 from entering the bus expansion circuit. At 72, if the host system is requesting to write data to the Port Write Data Register 20, the appropriate Port Write Data Register is selected at 75. At 76, the data is gated from the host computer to the selected Port Write Data Register 20 and at 77 the proper number of bytes (depending on the selected address at 75 to which the data was gated at 76) is gated from the Port Write Data Register 20 to the selected UART. Thereafter, the UART interrupts blocked at 71 are unblocked at 78. If, at 72 the request from the host computer system was not to write data to the Port Write Data Register 20 but, instead, was a request to write directly to a UART (e.g., a control byte), then at 73 the proper UART is selected by the UART Control Logic 12 and at 74 the data is gated directly to the UART. Thereafter, at 78 the UART interrupts, blocked at 71, are unblocked and the operation proceeds back to FIG. 3 to await further UART interrupts or I/O read or write requests.

In summary, an I/O bus expansion interface technique has been shown to enable an I/O device having an n-bit data bus to be interfaced to an m times n-bit I/O data bus of a host processor. The I/O bus expansion circuit disclosed herein is an interface which maximizes the computer processor's performance by providing full I/O data bus bandwidth and allowing overlap of processor execution and I/O bus expansion interface circuit operation. This is accomplished by: (1) prefetching multiple control and/or data fields from the I/O device and presenting that information to the host without delay and (2) burst writing multiple bytes from the host to the bus expansion interface circuit, without delay of the host, and thereafter making these bytes individually available to the I/O device.

While the invention has been shown and described with reference to particular embodiments thereof, it will be understood by those skilled in the art that the foregoing and other changes in form and details may be made therein without departing from the spirit and scope of the invention.

We claim:

1. An interface for communication between an I/O device connected to an n-bit I/O data bus and a processor connected to an m times n-bit processor I/O data bus, comprising:
   first register means for temporarily storing a group of fields of information, said information including at least one control field from said I/O device; and
   control logic means for (a) fetching said at least one control field from said I/O device, (b) decoding the content of said at least one control field, (c) fetching, a field at a time, a particular group of said fields of said information responsive to the result of said decoding the content of said at least one control field from said I/O device on said n-bit I/O data bus, (d) storing said particular group of fields of said information in said first register means including said at least one control field and (e) allowing simultaneous access to said particular group of fetched field stored in said first register means on said m times n-bit processor I/O data bus in a single m times n-bit read by said processor.

2. The interface circuit of claim 1, wherein said control logic means further comprises means for (f) detecting a read or write request from said processor; and (g) suspending any fetching from said I/O device of said particular group of said fields following said detecting said read request or said write request.

3. The interface circuit of claim 2, wherein said control logic means further comprises means for (h) resuming any fetching from said I/O device of said particular group of said fields following completion of a read or write request.

4. The interface circuit of claim 3, wherein said control logic means further comprises means for (i) generating an interrupt directed to said processor upon completion of said fetching of said particular group of said fields.

5. The interface circuit of claim 1,
   wherein said control logic means further comprises:
   (j) means for generating an interrupt directed to said processor upon completion of said storing said at least one control field; and
   means responsive to said means for generating said interrupt directed to said processor for allowing access to said control field by said processor.

6. A method for communicating information between an I/O device connected to an n-bit I/O data bus and a processor connected to an n-bit I/O data bus and a processor connected to an m times n-bit processor I/O data bus, said information including at least one control field from said I/O device, said method comprising:
   fetching said at least one control field from said I/O device;
   decoding the content of said at least one control field;
   fetching, a field at a time, a particular group of said fields of said information responsive to the result of decoding the content of said at least one control field from said I/O device on said n-bit I/O data bus;
   storing said particular group of fields of said information, including said at least one control field, in a register; and
   allowing simultaneous access to said particular group of fetched fields stored in said register on said m times n-bit processor I/O data bus in a single m times n-bit read by said processor.

7. The method for communicating information of claim 6, further comprising detecting a read or write request from said processor and suspending any fetching from said I/O device of said particular group of said fields following said detecting said read request or said write request.

8. The method for communicating information of claim 7, further comprising resuming any fetching from said I/O device of said particular group of said fields following completion of a read or write request.

9. The method for communicating information of claim 8, further comprising generating an interrupt directed to said processor upon completion of said fetching of said particular group of said fields.

10. The method for communicating information of claim 6, further comprising:
    generating an interrupt directed to said processor upon completion of said storing said at least one control field; and thereafter
    allowing access to said control field by said processor.

* * * * *

UNITED STATES PATENT AND TRADEMARK OFFICE
CERTIFICATE OF CORRECTION

PATENT NO.  :  5,014,236

DATED       :  May 7, 1991

INVENTOR(S) :  James S. Pogorzelski and Craig H. Shempert

It is certified that error appears in the above-identified patent and that said Letters Patent is hereby corrected as shown below:

Col. 7, line 61, please delete "field" and insert therefor --fields--;

Col. 8, lines 24-25, please delete "and a processor connected to an n-bit I/O data bus".

Signed and Sealed this

Twenty-second Day of December, 1992

Attest:

DOUGLAS B. COMER

Attesting Officer

Acting Commissioner of Patents and Trademarks